United States Patent

Poetker

[11] Patent Number: 5,352,060
[45] Date of Patent: Oct. 4, 1994

[54] ATTACHABLE HANDLE

[75] Inventor: Philip J. Poetker, Winnipeg, Canada

[73] Assignee: Poetker Dynamics Inc., Winnipeg, Canada

[21] Appl. No.: 8,994

[22] Filed: Jan. 26, 1993

[30] Foreign Application Priority Data

Apr. 24, 1992 [CA] Canada ................ 2067035

[51] Int. Cl.⁵ .............................................. F16B 7/08
[52] U.S. Cl. .................................. 403/233; 403/234; 403/230; 294/58; 16/114 R
[58] Field of Search ............... 403/291, 230, 233, 234, 403/237, 241, 299; 294/58, 31.2; 16/114 R

[56] References Cited

U.S. PATENT DOCUMENTS

| 681,283 | 8/1901 | Waynick . | |
|---|---|---|---|
| 1,572,995 | 2/1926 | Gatos | 403/233 X |
| 1,685,686 | 9/1928 | Smith | 403/233 X |
| 1,945,430 | 1/1934 | Garrett | 294/58 X |
| 1,953,238 | 4/1934 | Kosanovich . | |
| 2,428,942 | 10/1947 | Poglein . | |
| 2,430,802 | 11/1947 | Catlin . | |
| 2,482,589 | 9/1949 | Maguire . | |
| 2,490,838 | 12/1949 | Serio . | |
| 2,531,227 | 11/1950 | Lubins . | |
| 2,554,643 | 5/1951 | Serio . | |
| 2,614,879 | 10/1952 | Citso . | |
| 3,155,414 | 11/1964 | Bales . | |
| 3,311,399 | 3/1967 | Holton . | |
| 3,341,235 | 9/1967 | Mattson et al. | 403/234 |
| 4,155,582 | 5/1979 | Reisner . | |
| 4,368,556 | 1/1983 | Wanner et al. . | |
| 4,944,541 | 7/1990 | Waldschmidt . | |

FOREIGN PATENT DOCUMENTS

| 44544 | 10/1893 | Canada . | |
| 121537 | 10/1909 | Canada . | |
| 222536 | 8/1922 | Canada . | |
| 223696 | 9/1922 | Canada . | |
| 263357 | 8/1926 | Canada . | |
| 1081024 | 7/1990 | Canada . | |
| 1577315 | 10/1980 | United Kingdom | 403/237 |

OTHER PUBLICATIONS

C. & E. Fein GmbH & Co.-European Patent Application EP 0 132 593 A2; laid-open Feb. 1985.

Primary Examiner—Randolph A. Reese
Assistant Examiner—Harry C. Kim
Attorney, Agent, or Firm—Murray E. Thrift; Adrian D. Battison; Stanley G. Ade

[57] ABSTRACT

Attachment assembly for handles include a flexible strip which passes around a tool shaft or the like, and has opposed ends which mate to form a cylindrical male thread. This thread is engaged by a female thread in a hollow handle. Between the hollow handle and the shaft is a saddle through which the strip passes, it is rotatably mounted by a cylindrical tube in a recess in the hollow handle. It has a recessed rim which engages the tool shaft on tightening of the female screw. Another version mounts an angled D handle rotatably on the saddle cylindrical tube, by a concentric outer cylindrical tube. A nut engages the male cylindrical thread, and pushes the saddle against the tool shaft. The strip can accommodate tool shafts over a diameter range varying by a factor of four.

14 Claims, 6 Drawing Sheets

ATTACHABLE HANDLE

This invention relates to attachable handles for tools and similar implements. Such devices are known, typically they consist of a D grip, such as that of a spade, fork, or snow shovel, having attachment means for tool or implement having a bar, shank, pole, rod, shaft or tube. Typically the attachment means are clamping or gripping means. The present invention envisages hollow tube means having female thread means adapted to engage clamping or gripping means having paired ends having male thread means to fit the female thread means. Appropriate rotation of the tube allows tightening or slackening of clamping means around the bar, shank, shaft, rod, pole or tube. The hollow tube may form the handle or may rotatably mount a D handle.

Although the invention will be described and referred to specifically as it relates to hollow tube means, and clamping means, mutually engaging by thread means, it will be understood that the principles of this invention are equally applicable to similar systems and accordingly, it will be understood that the invention is not limited to such systems.

PRIOR ART AND BACKGROUND OF INVENTION

The following U.S. patents describe related devices
U.S. Pat. No. 2,430,802—Catlin
U.S. Pat. No. 2,482,589—Maguire
U.S. Pat. No. 2,531,227—Lubins
U.S. Pat. No. 2,614,879—Citso
U.S. Pat. No. 3,155,414—Bales
U.S. Pat. No. 4,155,582—Reisner
U.S. Pat. No. 4,944,541—Waldschmidt Similarly the following Canadian patents teach related devices
44,544—Walsh (1)
121,537—Hunt et al.
222,536—Jewell
223,696—Coleman
263,357—Walsh (2)
1,081,024—Vaslas These generally have a D type handle (except Maguire, which has a cylindrical handle) attachable to a tool shank, shaft, rod, pole or tube by a variety of clamping and attachment means, which may be snap on cylindrical (Walsh (1)), cylindrical with wing portions connected by a threaded bolt (Jewell, Maguire, Citso), pivoted cylindrical with wing portions connected by a threaded bolt (Hunt et al., Catlin), spike into the shank (Coleman), bolt through the shank (Walsh (2) and Waldschmidt), two part bolted clamp to fit specific diameter shank (Lubins), U clamp with semi-cylindrical seat to fit specific diameter shank (Bales), serrated shaft engaging portion and screw tightenable flexible adjustable strap (Reisner), opposed fixed winged semi-cylindrical connected by paired threaded bolts (Vaslas). The handle may fixed with respect to the attachment means or pivoted by ball joint (Catlin), rotatable about an axis perpendicular to the shank (Catlin) rotatable in the plane of the shank (Hunt et al., Coleman, Walsh (2), Lubins, Vaslas, Waldschmidt). None of these provide a simple effective device for attachment to a variety of tool shanks.

There are U.S. patents describing fruit jar and coffee pot holders.
U.S. Pat. No. 681,283—Waynick
U.S. Pat. No. 1,953,238—Kosanovich
U.S. Pat. No. 2,428,942—Poglein
U.S. Pat. No. 2,490,838—Serio (1)
U.S. Pat. No. 2,554,643—Serio (2)
U.S. Pat. No. 3,311,339—Holton These describe a band or loop, passed around a cylindrical object, having its ends secured within a handle. The ends may be integrally united and threadably received in a nut within the handle (Waynick), clamped within paired handle parts together so that holes within the ends correspond and receive a bolt (Kosanovich), snap fitted together in a socket in the handle (Poglein), have threaded ends which fit the handle and are secured thereto by an overriding nut (Serio (1)), have ends which fit grooves in the handle, and are held in place by an overriding nut threaded onto the handle (Serio (2)), are threaded and received in a recess in the handle, where they are engaged by a threaded bolt (Holton). Only Kosanovich teaches band or loop perimeter changes, in the rest the band or loop is rigid as in Waynick, or such adjustment as is present is to overcome tolerance variation.

It is an object of the invention to provide an improved attachable handle for tool or similar implement shanks, which will fit a range of shank sizes. A further object is to provide an improved attachable rotatable D handle for tool or similar implement shanks, which will fit a range of shank sizes. A subsidiary object is to provide an attachable rotatable loop or D handle for tool or similar implement shanks, which is lockable in position. Other objects will be apparent to those skilled in the art from the following specification, appended claims and accompanying drawings.

DESCRIPTION OF THE INVENTION

In one broad aspect the invention is directed to a flexible strip to be secured around bars of tools and the like of given diameter, which includes opposed terminal means, central means, and opposed connecting means extending between the central means and the terminal means. Each of the opposed terminal means has cooperating interlocking means and opposed outer thread means. The central means has width greater than the opposed connecting means and the opposed terminal means. The central means releasably engages the bar means of given diameter.

Preferably the cooperating interlocking means includes projection means on one terminal means and recess means to matingly engage the projection means on the other terminal means. Preferably the central means, and each of the opposed connecting means have cross sectional areas at least equal to that of each of the terminal means. The cross sectional area of the terminal means does not include the cross sectional area of the thread means. When the terminal means are interlocked they form a cylindrical thread.

The central means are sufficiently flexible to releasably engage bar means varying in diameter. The opposed connecting means are similarly flexible, although they usually contact the bar means they do not primarily releasably engage it. In one version the bars may vary by a factor of four in diameter, from $\frac{1}{2}$ inch to 2 inch, in another version from $\frac{3}{4}$ inch to $1\frac{3}{4}$ inch or 2 inch. These are practical experimental results. When the length of the cylindrical thread is $1\frac{3}{4}$ inch the maximum change shown in diameter of the bar is from 1 up to $1\frac{1}{2}$ inches, or from between about 57% to about 86% of the length of the thread. As would be appreciated by those skilled in the art the bar and strip may be changed in dimension to achieve similar proportionate results. The central means, opposed connecting means and terminal means may conveniently approximate in length to the largest diameter of the cylindrical bar means to be accommodated. The central means to accommodate the bar means may however be unrelated in size to the connecting means and terminal means, and may be lengthened considerably to accommodate a specific bar means much larger in dimension than the connecting and terminal means.

In a second broad aspect the invention is directed to saddle member means for assisting in securing bars of tools and the like of given diameter, comprising first block means having first and second ends, and second block means joined thereto at the second end. The second block means is lesser in dimension than the second end of the first block means. The second block means includes first cylindrical tube means. The first block means includes frustroconical aperture means tapering from the first end to the second end. This frustroconical aperture means has a diameter at the second end substantially identical to that of the cylindrical tube means, and a substantially greater diameter at the first end. The first block means includes first rim means at the first end circumjacent the frustroconical aperture means. Paired diametrically opposed peripheral curved recesses extend into the first rim means toward the second end. Preferably there are two pairs of diametrically opposed peripheral curved recesses, equispaced around the first rim means. The first block means is conveniently cylindrical. In one form the curved recesses may have their smallest radius of curvature at the deepest point increasing outward to largest radius of curvature at the first end of the first cylindrical means, where the smallest radius of curvature corresponds to that of the smallest diameter bar means, the largest radius of curvature, corresponds to the largest diameter bar means. In another form a single radius of curvature may be used approximating the largest diameter bar means. Circumferential grooves may be present in the first block means to allow distortion of the first block means, first end and first rim means, in contact with bar means.

In a third broad aspect the invention is directed to kit means for securing to bars of tools and the like comprising, a flexible strip to be secured around bars of tools and the like of given diameter. The strip comprises opposed terminal means, central means, and opposed connecting means extending between the central means and the terminal means. Each of the opposed terminal means has cooperating interlocking means and opposed outer thread means. The central means has width greater than the opposed connecting means and the opposed terminal means. The central means releasably engages the bar means of given diameter. Saddle member means comprise first block means having first and second ends, and second block means joined thereto at the second end. The second block means is lesser in dimension than the second end of the first block means. The second block means includes first cylindrical tube means. The first block means includes frustroconical aperture means tapering from the first end to the second end. This frustroconical aperture means has a diameter at the second end substantially identical to that of the cylindrical tube means, and a substantially greater diameter at the first end. The first block means including first rim means at the first end circumjacent the frustroconical aperture means. Paired diametrically opposed peripheral curved recesses may extend into the first rim means toward the second end. The flexible strip opposed connecting means and the flexible strip opposed terminal means when interlocked are passable through the saddle member means. There are female thread means to engage the flexible strip thread means. Additionally second cylindrical tube means comprises cylindrical recess means adapted to be mounted slidably and rotatably about the first cylindrical tube means and female thread means to engage the flexible strip thread means. The second cylindrical tube means forms handle means. The cooperating interlocking means comprise projection means on one the terminal means and recess means to matingly engage the projection means on the other the terminal means. Preferably the central means, and the opposed connecting means have cross sectional areas at least equal to that of each of the terminal means, the cross sectional area of the terminal means not including the cross sectional area of the thread means. When interlocked the terminal means form a cylindrical thread.

Preferably D handle cylindrical tube means adapted to be mounted slidably and rotatably about the first cylindrical tube means are present. The D handle cylindrical tube means includes D handle means, and the female thread means includes nut means, having gripping means thereon. The D handle means may comprise opposed arms inclined to the axis of the D handle cylindrical tube means, the opposed arms being joined by cross hand grip means. These arms are preferably inclined at an angle of about 45 degrees to the axis of the D handle cylindrical tube means. The saddle member means may include two pairs of diametrically opposed peripheral curved recesses, the recesses being equispaced around the first rim means.

The D handle cylindrical tube means may comprise first planar end surface means nearer the cross hand grip means, and second planar end surface means further from the cross hand grip means. The second planar end surface means is able to contact planar surface means of the first block means of the saddle member means. This second planar end surface means contains circular groove means. The structure additionally comprises O ring means to fit in the circular groove means. Whereby when the second planar surface means of the D handle cylindrical tube contacts the planar surface means of the first cylindrical portion of the saddle member means, the O ring means is compressed in the circular groove means, and forms a tight friction fit, fixing the D handle grip means and the saddle member means in relative position.

The nut means preferably comprises central female threaded passage means extending therethrough, planar surface means to contact the D handle cylindrical tube means, and gripping means extending outward from the passage means. The nut means may include flange means including the planar surface means. The nut means may include gripping means extending outward from the passage means. In some cases it is preferred that the D handle means directly include female threaded screw member means. The nut means preferably has knurled peripheral surface means, and the D handle means comprises opposed arms attached to the D handle cylindrical tube means, joined by cross hand grip means. The inclination of the arms of the D handle means to the axis of the D handle cylindrical tube means may be 90 degrees without particular difficultly. Preferred is from about 30 to about 60 degrees. More preferably the arms are inclined at an angle of about 45 to about 55 degrees to the axis of the D handle cylindrical tube means. An especially preferred inclination is about 45 degrees.

The elements of the third broad aspect of the invention include those of the first and second aspects.

The dimensions of the connecting means of the strip means must be less in width and thickness than the (male threaded) end means outer diameter, because otherwise it will not pass into the cylindrical tube means of the saddle member means, and the device will not be adjustable. It is found highly desirable from engineering considerations that the cross sectional areas of the connecting and central means are at least as great as the effective cross sectional area of the end means, that is the portion within the inner diameter (excluding the male thread).

A major advantage of the split ends and connectors of the strip is that the handle device can be passed around a bar handle, which it attached at both ends. The strip is virtually infinitely adjustable between its limits. The saddle allows tight frictional gripping of the bar, and distortion of the recesses to fit the bar.

BRIEF DESCRIPTION OF THE DRAWINGS

Preferred embodiments are indicated in the drawings where.

DESCRIPTION OF THE PREFERRED EMBODIMENTS

Figure 1:
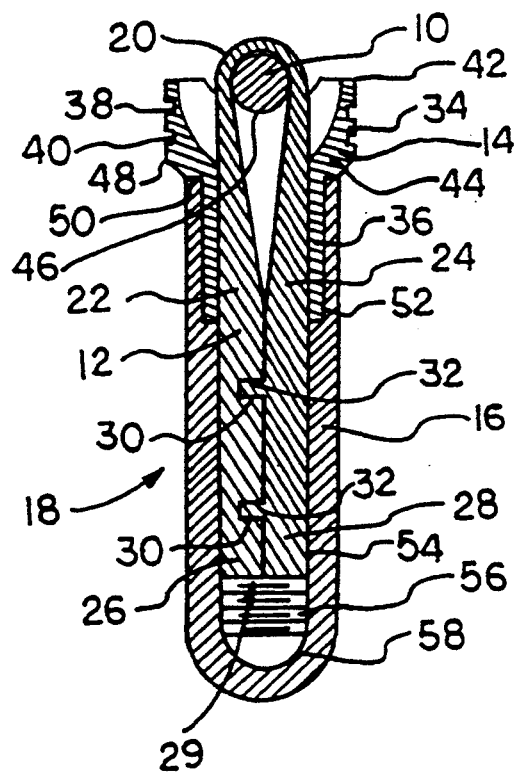
FIG. 1 shows a sectional view of a first embodiment of the invention attached to a tool shank, transverse to the shank.

The general description of the invention is now expanded by reference to the drawings, which illustrate preferred embodiments of the invention.

In FIGS. 1 to 4, numeral 10 generally indicates the tool shank, engaged in combination by flexible strip 12, saddle 14, and internally threaded tube 16, forming handle attachement 18. Flexible strip 12 has central portion 20, which is the shank engaging portion, connecting portions 22 and 24, and terminal portions 26 and 28. Terminal portion 26 include recesses 30, which matingly engage projections 32 of terminal portion 28. When thus matingly engaged terminal portions 26 and 28 form cylinder 29 of about ¾ inch diameter and about 2 inch length having a male exterior thread. Connecting portions 22 and 24 taper in maximum thickness from about 9/32 inch adjacent terminal portions 26 and 28 to about ⅛ inch adjacent central portion 20, the connecting portions taper little or not at all in width, remaining about ¾ inch wide. Central portion 20 is about 2¼ inch long, has maximum width about 1½ inch, which smoothly curves into connecting portions 22 and 24, it has maximum thickness about ⅛ inch. Saddle member 14 consists of saddle 34 and integral stub tube 36, which is rotatably mounted in threaded tube 16. Saddle 34 has a cylindrical exterior with peripheral grooves 38 and 40, and a tapered interior which extends from rounded edge 42 to tube end 44, edge 42 has opposed curved recesses 46 to accommodate shank 10, saddle 34 also has peripheral bevel 48 and shoulder 50. Tube 36 is about 1⅛ inch deep with outer diameter about 1 inch, and inner diameter about ¾ inch. Saddle 34 is about ¾ inch deep and about 1½ inch external diameter, edge 42 is rounded and about ⅛ inch thick, recess 46 is about ¼ inch deep and about ⅞ inch across of smoothly curvature with the radius about ¼ inch at the bottom and about ⅞ inch at the edge. Internally threaded tube 16 is has cylindrical recess 52, to accommodate stub tube 36, the cylindrical interior 54 of threaded tube 16 is a female threaded screw 56 extending from recess 52 to rounded end 58. Tube 16 is about 4¼ inches long, and has external diameter about 1¼ inches, internal diameter about ¾ inch, recess 52 has internal diameter about 1 inch and extends about 1⅛ inch along tube 16.

In use strip 12 is unthreaded and placed around tool shank 10, terminal portions 26 and 28 are engaged by fitting projections 32 into recesses 30, to form cylinder 29, saddle member 14 is slid over cylinder 29 as is tube 16, which is rotated threadably engaging cylinder 29. Tube 16 pushes saddle member 14 until it approaches shank 10, as tube 16 advances saddle member 14 which can freely rotate receives shank 10 within recesses 46. As shown shank 10 is about ½ inch diameter. When shank 10 is between about 1¾ or 2 inch in diameter, as in FIG. 3, recess 46 and saddle 34 distort to tightly frictionally engage shank 10, grooves 38 and 40, although not absolutely necessary to achieve this end, are preferred as they make distortion easier. Rounded edges 42 and interior taper of saddle 14 prevent damage to strip 12, when contacting saddle 34.

Figure 4:
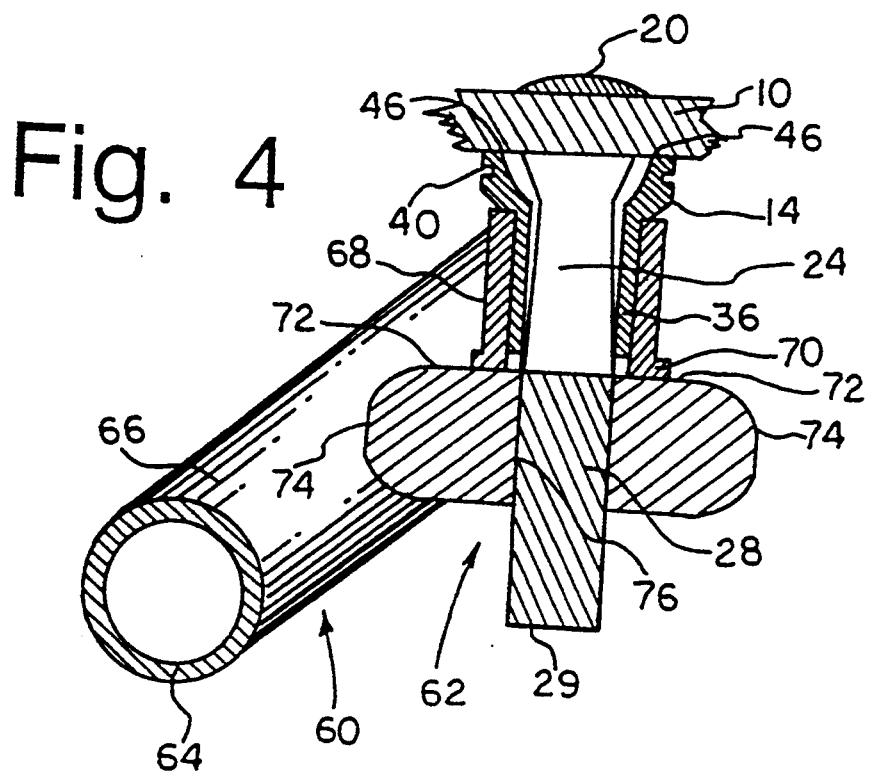
FIG. 4 shows a sectional view of a second embodiment of the invention attached to a tool shank, longitudinal to the shank.
Figure 5:
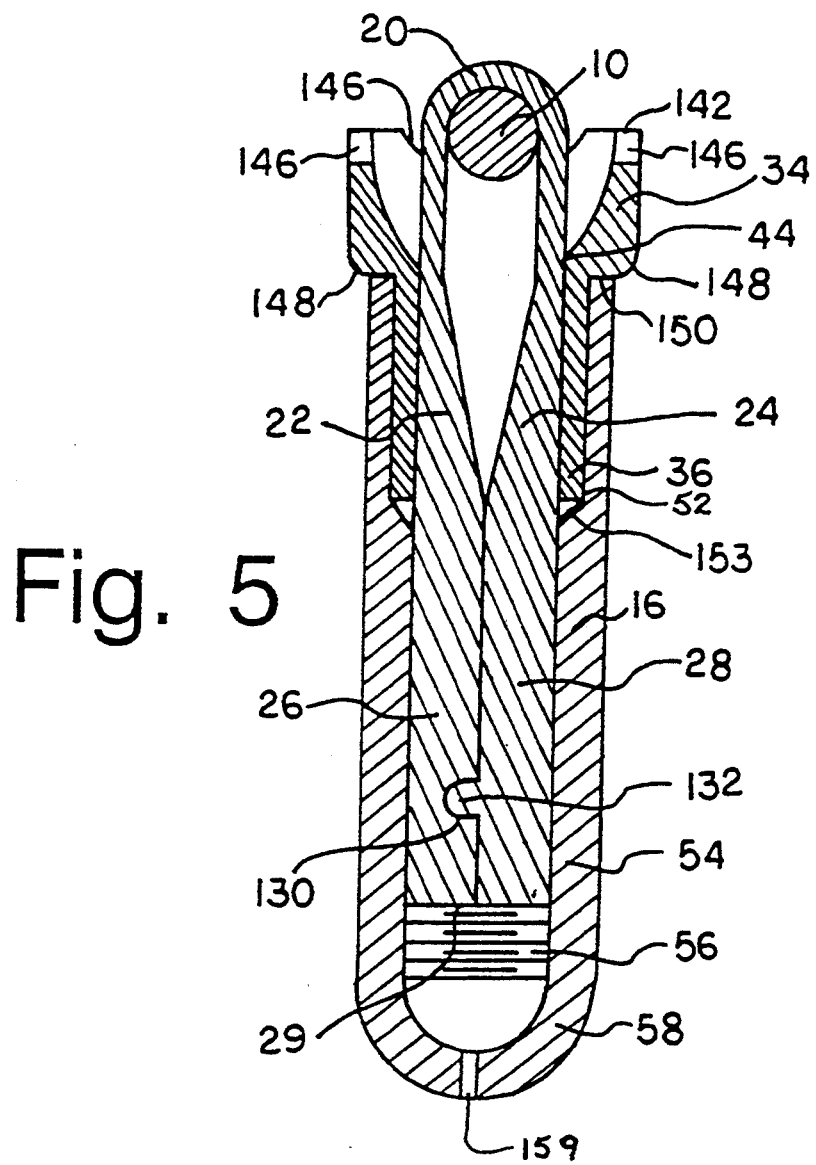
FIG. 5 shows a part sectional view of a third embodiment of the invention attached to a tool shank, transverse to the shank.
Figure 6:
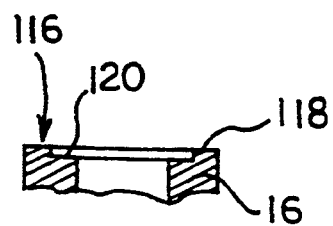
FIG. 6 shows a sectional detail view of the embodiment of FIG. 5.

In FIG. 4, is shown a related embodiment, D handle 60 is held in place by stop nut 62, D handle includes hollow cylindrical cross grip 64, side arms 66, and tube 68, which is swivellably mounted about stub tube 36 of saddle member 14. Arm 66 tapers from about 1⅜ inch to about 1¼ inch at cross grip 64. Arm 66 is about 5½ inches long, but may be as much as about 6¼ inches long. The angle of arm 66 to the center line of cylinder 29 is about 45 degrees. Cross grip 64 is about 1⅜ inch diameter. Tube 68 is about 1⅜ inch external diameter and about 1 inch internal diameter. Tube 68 has end washer 70, preferably as shown integral, washer 70 is about 1 inch internal diameter and about ¼ inch wide. Stop nut 62 has flat washer engaging surface 72, knurled cylindrical portion 74, about 3¼ inch diameter providing a hand grip, and cylindrical female threaded passage 76 about ¾ inch in diameter and about 1⅛ inch long.

In use strip 12 is unthreaded and placed around tool shank 10, terminal portions 26 and 28 are engaged by fitting projections 32 into recesses 30, to form cylinder 29, saddle member 14 is slid over cylinder 29 as is tube 68, which is slid over stub tube 36. Stop nut 62 is rotated threadably engaging cylinder 29. Stop nut 62 pushes washer 70 and thus tube 68 into saddle member 14 which approaches shank 10, as stop nut 62 advances saddle member 14 which can freely rotate receives shank 10 within recesses 46, as shown shank 10 is ½ inch diameter.

In FIGS. 5 to 16, the component parts are basically similar, dimensions are somewhat less from post mold shrinkage. The numeral 10 generally indicates the tool shank, engaged in combination by flexible strip 12, saddle 14, and internally threaded tube 16, forming handle attachment 18. Flexible strip 12 has central portion 20, which is the shank engaging portion, connecting portions 22 and 24, and terminal portions 26 and 28. Terminal portion 26 includes single recess 130, which matingly engages roughly hemispherical projection 132 of terminal portion 28. When thus matingly engaged terminal portions 26 and 28 form cylinder 29 of about ¾ inch diameter and about 2 inch length having a male exterior thread. Connecting portions 22 and 24 taper in maximum thickness from about 5/16 inch adjacent terminal portions 26 and 28 to about ⅛ inch in central portion 20, and are about 1¼ inches long, they taper little in width, remaining about ⅜ inch wide. Central portion 20 is about 4 inches long, has maximum width about 1½ inch, which smoothly curves convexly into connecting portions 22 and 24, it has maximum thickness about ⅛ inch. Saddle member 14 consists of saddle 34 and integral stub tube 36, which is rotatably mounted in threaded tube 16. Saddle 34 has a cylindrical exterior and a tapered interior which extends from edge 142 to tube end 44, edge 142 has four opposed curved recesses 146 to accommodate shank 10, saddle 34 also has peripheral bottom curve 148 and shoulder 150. Tube 36 is about 1⅛ inch deep with outer diameter about 1 inch, and inner diameter about ¾ inch. Saddle 34 is about 11/16 inch deep and about 1⅜ inch external diameter, edge 142 is about ⅛ inch thick, recesses 146 are about ¼ inch deep and about ¾ inch across of smooth curvature of radius about ½ inch. The four paired opposed recesses 146 are to simplify use. In use the saddle tends to have to be hand adjusted to fit the tool shank, when two opposed recesses are used, with four it tends to contact without hand adjustment. Internally threaded tube 16 has cylindrical recess 52 with bottom bevel 153, to accommodate stub tube 36, the cylindrical interior 54 of threaded tube 16 is a female threaded screw 56 extending from recess 52 to rounded end 58, which has cylindrical orifice 159, a manufacturing detail. Tube 16 is about 4 inches long, and has external diameter about 1¼ inches, internal diameter about ¾ inch, recess 52 has internal diamter about 1 inch and extends about 1⅛ inch along tube 16, and is large enough to fully accommodate tube 36. Tube 16 has modified lip 116, this has outer lip 118 and slightly recessed inner lip 120, the depth is exaggerated in FIG. 6, recessed inner lip 120 typically 1/100 or 2/100 inch deep, allows easier insertion of saddle tube 36 into tube 16, and less friction and wear between saddle and handle.

Figure 2:
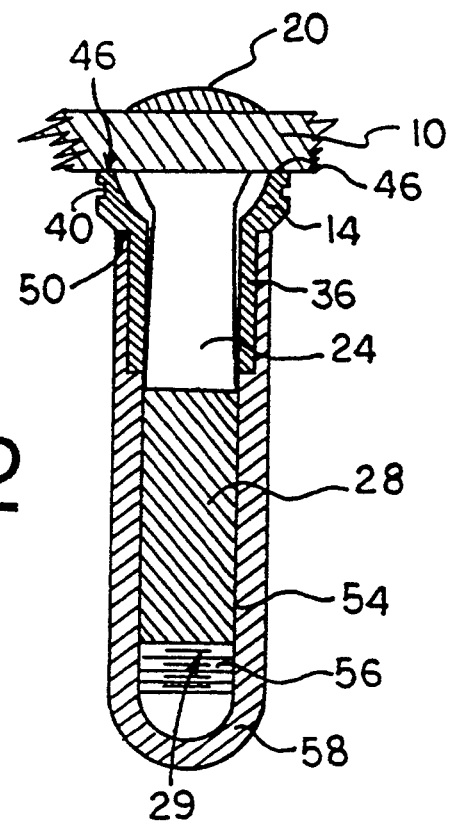
FIG. 2 shows a sectional view of the embodiment of FIG. 1, longitudinal to the shank.
Figure 3:
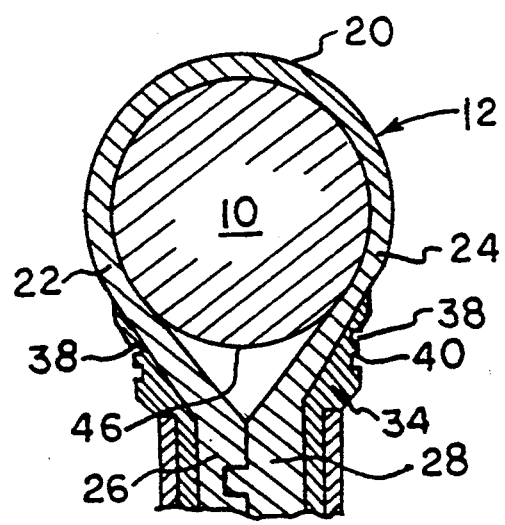
FIG. 3 shows a sectional view of the embodiment of FIG. 1, transverse to a tool shank of different size.

In use this embodiment is similar to the embodiment of FIGS. 1 to 3, except the strip is designed to accommodate shanks of diameter about ¾ to 1¾ inch, lesser and greater diameter shanks can be accommodated as the diameter diverges from these limits, down to about ½ inch and up to about 2 inch.

Figure 7:
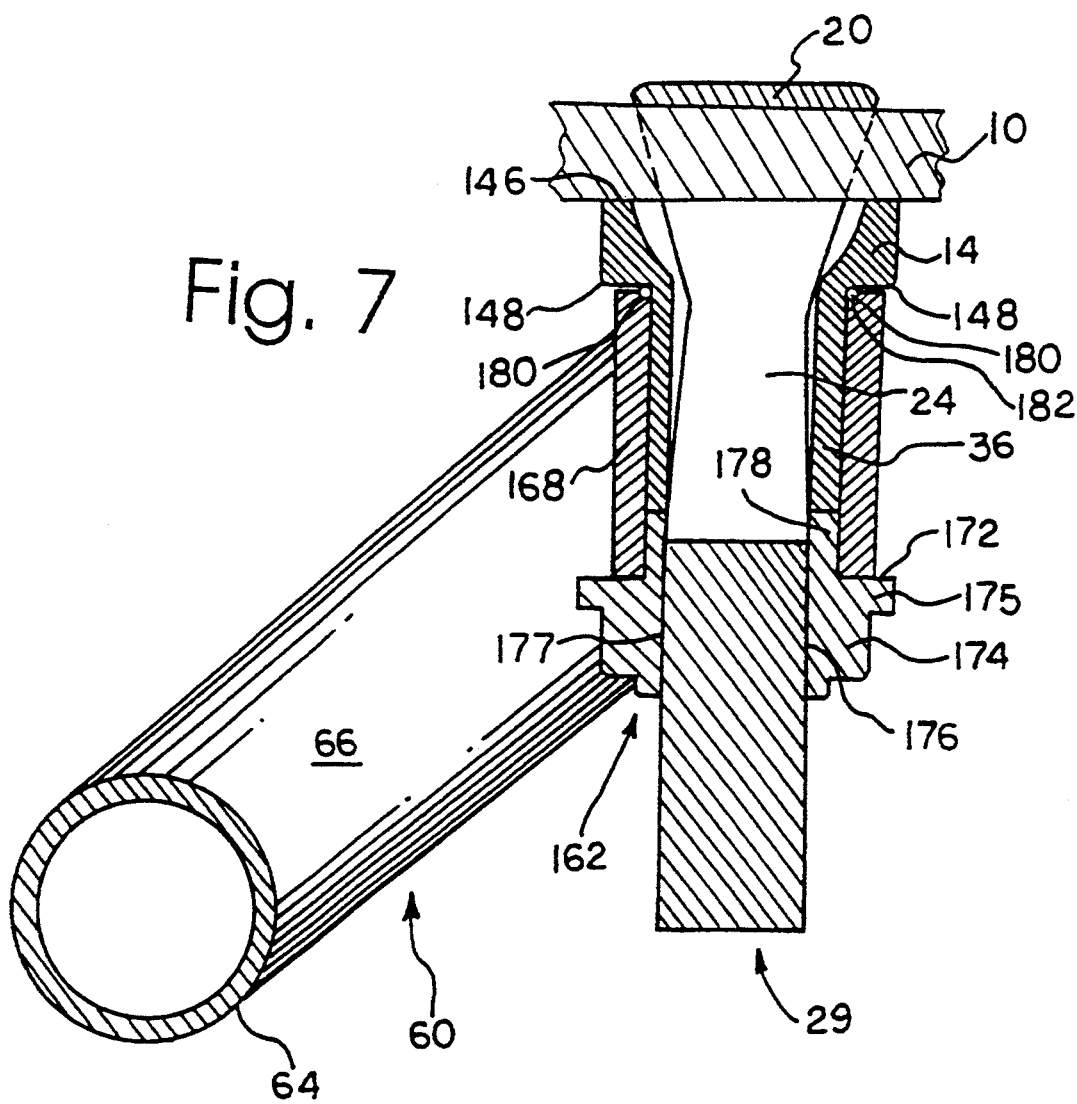
FIG. 7 shows a part sectional view of a fourth embodiment of the invention attached to a tool shank, longitudinal to the shank.
Figure 8:
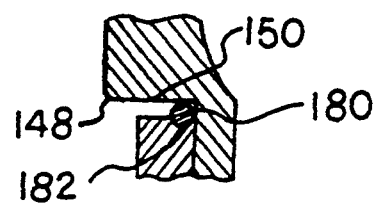
FIG. 8 shows an expanded sectional detail view of the embodiment of FIG. 7.
Figure 9:
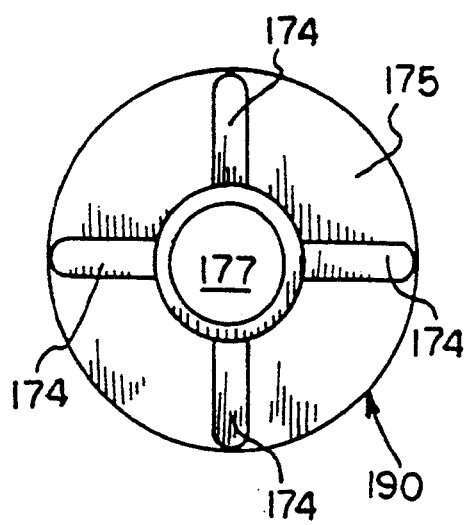
FIGS. 9 to 11, 13 and 15 show plan views of alternative embodiments of a component of FIG. 7.
Figure 10:
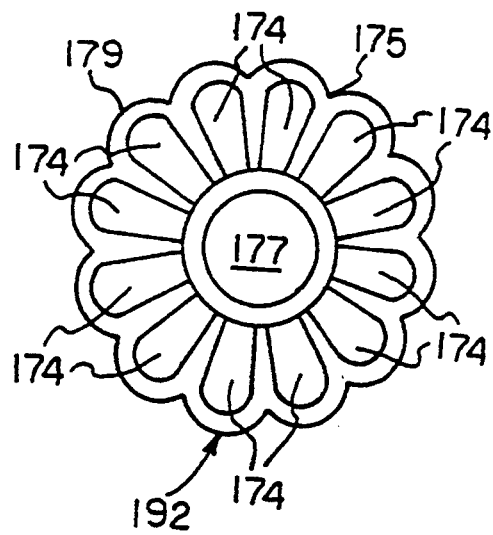
Figure 11:
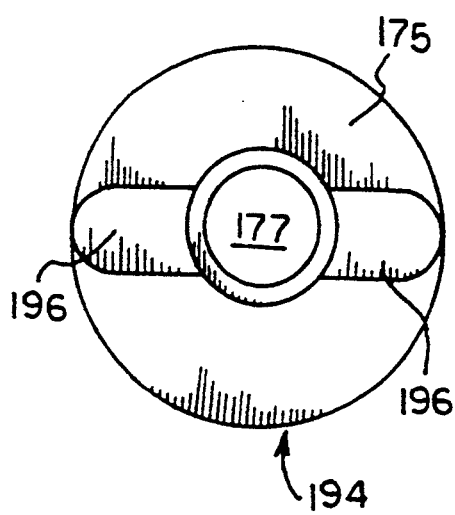
Figure 12:
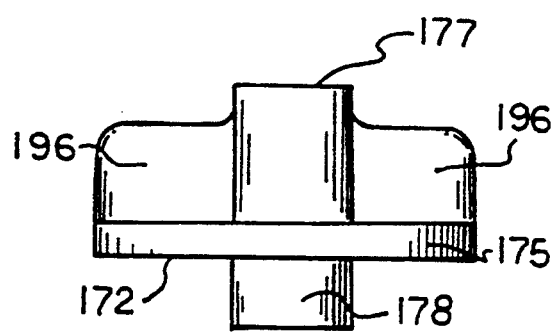
FIGS. 12, 14 and 16 show side views of the embodiments of FIGS. 11, 13 and 15.
Figure 13:
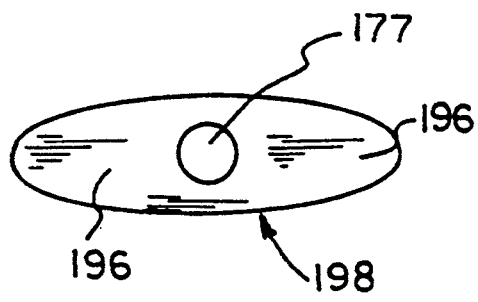
Figure 14:
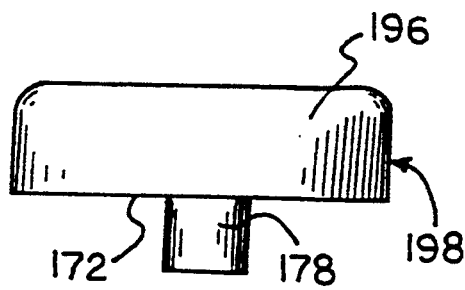
Figure 15:
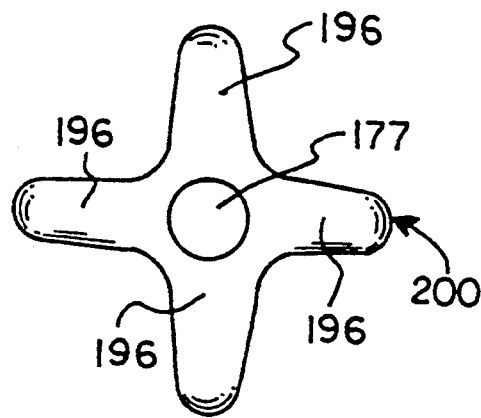
Figure 16:
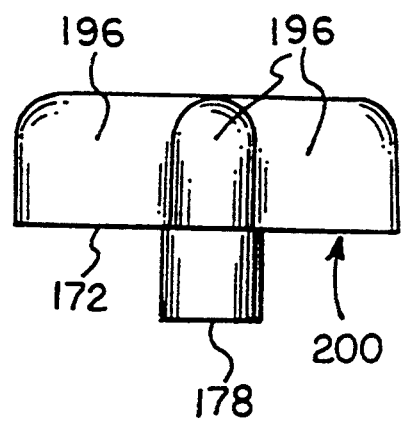

In FIG. 7, is shown a related embodiment, D handle 60 is held in place by stop nut 162, D handle includes hollow cylindrical cross grip 64, side arms 66, and tube 168, which is swivellably mounted about stub tube 36 of saddle member 14. Stop nut 162 has flat engaging surface 172, ridged portions 174 providing a hand grip, and cylindrical female threaded surface 176, threadably engaging cylinder 29. Stop nut 162 pushes tube 168 into saddle member 14 which approaches shank 10, as stop nut 162 advances saddle member 14 which can freely rotate receives shank 10 within recesses 146, as shown shank 10 is ½ inch diameter. O ring 180 lying partly within recess 182 compresses between surface 150 of saddle 14 and tube 168 (shown in FIG. 8) thus locking the tube into position with respect to shank 10, which prevents the D handle from rotating. Tube 168 is about 1 7/16 inch external diameter, about 1 inch internal diameter, and about 1½ inch long. O ring 180 is about 1¼ inch in diameter and has thickness about 1/10 inch, it lies within similarly dimensioned circular recess 182, which is about 1/20 inch deep. Nut 162 has flange 175 having on one side engaging surface 172 having an outer diameter of about 1½ inches and an inner diameter of about 1 inches. Inner tube surface 177 which includes female threaded surface 176 of stop nut 162, is about ¾ inch in internal diameter and forms a tube about 1⅛ inch deep which protrudes about 5/16 inch beyond engaging surface 172 forming stub tube 178. Arm 66 tapers from about 1¼ inch across at grip 64, which itself is about 1¼ inch in diameter and about 3/16 inch thick, to about 1⅜ inch, arm 66 is about 5¾ inches long, (from the furthest portion of tube 168) and about ¼ inches thick, but may be varied. The angle of arm 66 to the center line of cylinder 29 is about 45 degrees.

Stop nuts 62 and 162 must be hand tightenable to be practically effective. As would be understood by those skilled in the art, a wide variety of effective hand conventional tightenable stop nuts may be employed in the invention. Stop nut 162 may have several forms 190, 192, 194, 198, and 200 as shown. Form 190 has equispaced four ridges or fins 174 extending outward from central tube 177, tube 177 is about ⅛ inch thick, ridges 174 extend outward therefrom some ¼ or 5/16 inch and extend some 7/16 inch from flange 175. Form 192 has twelve equispaced ridges 174 of similar dimensions to those of form 192, the edge of flange 175 has a series of arcuate projections 179, each corresponding to a ridge 174. Form 194 has two opposed projections 196 these are approximately ½ inch thick and curve to conform with tube 177 and flange 175, they are from about 11/16 to ⅞ inch tall from surface 172, stub tube 178 extends about 5/16 inch from surface 172 while tube 177 is approximately 1 ⅛ inches from end to end. Form 198 is composed of two opposed projections 196, while form 200 is composed of four opposed projections 196. Stub tube 178 is optional, but is found to form a convenient guide for nut 162 within tube 168.

Flexible strip 12, saddle member 34, internally threaded tube 16, D handle 60, stop nuts 62 and 162 are preferably composed of high density polyethylene, as would be understood by those skilled in the art, linear high density polyethylene, nylon, and other suitable plastic materials, and suitable commonly available metals, and other similar materials of similar properties may be utilized for this purpose.

The dimensions as noted above are indicative rather than exact. FIGS. 1 to 4 described first versions of working embodiments. FIGS. 5 to 10 describe second versions of working embodiments. FIGS. 11 to 16 similarly describe further versions of working embodiments. As would be routinely understood by those skilled in the art, the precise dimensions are not required to understand the principles of construction of the embodiments of the contemplated invention.

As those skilled in the art would realise these preferred illustrated dimensions, details and components can be subjected to substantial variation, modification, change, alteration, and substitution without affecting or modifying the function of the illustrated embodiments. Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. Kit means for securing to a round object, said kit means comprising:
   a flexible strip to be secured around the object, the strip comprising opposed terminal means, central means, and opposed connecting means extending between said central means and said terminal means,
   said opposed terminal means having cooperating interlocking means and opposed outer thread means
   said central means having a width greater than said opposed connecting means and said opposed terminal means
   said central means being adaptable to releasably engage said object,
   saddle member means comprising first block means having first and second ends, and second block means joined thereto at said second end,
   said second block means being lesser in dimension than said second end of said first block means, said second block means including first cylindrical tube means with a through passage of a predetermined diameter,
   said first block means including frustoconical aperture means tapering from said first end to said second end, said frustoconical aperture means having a diameter at said second end substantially identical to the predetermined diameter of the through passage of said cylindrical tube means, and a substantially greater diameter at said first end, said first block means including first rim means at said first end circumjacent said frustoconical aperture means,
   paired diametrically opposed peripheral curved recesses extending into said first rim means toward said second end
   said flexible strip opposed terminal means when interlocked being passable through said saddle member means, and
   female thread means to engage said flexible strip thread means.

2. Kit means are defined in claim 1, wherein second cylindrical tube means comprises cylindrical recess means adapted to be mounted slidably and rotatably about said first cylindrical tube means and female thread means to engage said flexible strip thread means, said second cylindrical tube means forming handle means.

3. Kit means as defined in claim 2, wherein the terminal means have mating faces and said cooperating interlocking means comprise projection means on one of said mating faces of said terminal means and recess means on other of said mating faces of said terminal means for engaging the projection means.

4. Kit means as defined in claim 1, wherein said central means, and said opposed connecting means have cross sectional areas at least equal to that of each of said terminal means, said cross sectional area of said terminal means not including the cross sectional area of said thread means.

5. Kit means as defined in claim 1, additionally comprising D handle cylindrical tube means having an axis, and adapted to be mounted slidably and rotatably about said first cylindrical tube means, said D handle cylindrical tube means comprising D handle means, and wherein said female thread means includes nut means, having gripping means thereon.

6. Kit means as defined in claim 5, wherein said D handle means comprises opposed arms inclined to the axis of said D handle cylindrical tube means, said opposed arms being joined by cross hand grip means.

7. Kit means as defined in claim 6, wherein said arms are inclined at an angle of about 45 degrees to said axis of said D handle cylindrical tube means.

8. Kit means as defined in claim 6, wherein said D handle cylindrical tube means comprises first planar end surface means nearer said cross hand grip means, and second planar end surface means further from said cross hand grip means, said second planar end surface means being able to contact planar surface means of said first block means of said saddle member means, said second planar end surface means containing circular groove means,
   and wherein said kit means additionally comprise O ring means to fit in said circular groove means,
   whereby when said second planar surface means of said D handle cylindrical tube contacts said planar surface means of said first cylindrical portion of said saddle member means, said O ring means is compressed in said circular groove means, and forms a tight friction fit, fixing said D handle grip means and said saddle member means in relative position.

9. Kit means as defined in claim 8, wherein said nut means comprises central female threaded passage means extending therethrough, planar surface means to contact said D handle cylindrical tube means, and gripping means extending outward from said passage means.

10. Kit means as defined in claim 5, wherein the terminal means have mating faces and said cooperating interlocking means comprise projection means on one of said mating faces of said terminal means and recess means on other of said mating faces of said terminal means to engage the projection means.

11. Kit means as defined in claim 5, wherein said central means, and said opposed connecting means have cross sectional areas at least equal to a cross sectional area of said terminal means, said cross sectional area of said terminal means not including the cross sectional area of said thread means.

12. Kit means as defined in claim 5, wherein said saddle means comprises two pairs of said diametrically opposed peripheral curved recesses, said recesses being equispaced around said first rim means.

13. Kit means as defined in claim 5, wherein said nut means comprises central female threaded passage means extending therethrough, planar surface means to contact said D handle cylindrical tube means, and gripping means extending outward from said passage means.

14. Kit means as defined in claim 13, wherein said nut means comprises flange means including said planar surface means.

* * * * *